Patented Dec. 4, 1934

UNITED STATES PATENT OFFICE 1,982,903

ORGANIC ESTERS OF THIOPHOSPHORIC ACID

Erik Clemmensen, St. Louis, Mo., assignor, by mesne assignments, to Monsanto Chemical Company, a corporation of Delaware No Drawing. Application December 31, 1931, Serial No. 584,290

5 Claims. (Cl. 260—99.20)

This invention relates to a novel class of chemical compositions characterized in that they are thiophosphoric acid esters embodying both aromatic and aliphatic radicals, and contemplates a use of this novel class of compositions in the arts.

Triphenyl phosphate and tricresyl phosphate are used in large quantities in the manufacture of cellulose acetate products and cellulose nitrate products, respectively. The principal function of these phosphates is that of a fire retardant. Moreover, the use of this class of materials is restricted by the fact that the materials are not particularly good solvents for the cellulose compositions.

I have discovered that esters of thiophosphoric acid having both aliphatic and aromatic radicals are not only good fire retardants for both cellulose acetate and cellulose nitrate, but are distinctly superior in that they are stable and substantially more compatible with cellulose compositions than analogous products now employed in the arts, and may be manufactured at a cost which compares favorably with the cost of analogous present day products. Products, including films, lacquers, filaments, etc., made of the novel class of compositions disclosed herein are practically non-inflammable, possess inordinate flexibility, are stable to light and otherwise resist deterioration upon aging. Moreover, the fact that this class of compositions possesses a marked degree of solvent action for the respective cellulose products as compared to present day fire retardants practically eliminates the danger of exceeding the limit of solubility while at the same time imparting the desired fire retarding properties to the finished product.

Although this novel class of compositions is particularly suited to the manufacture of cellulose esters and ethers, it may be used advantageously as a plasticizing agent for other plastics, notably, phenol-aldehyde resins, urea or thiourea-aldehyde resins, polyhydric-alcohol-polybasic-acid resins, which may be modified to include monobasic acids, natural waxes and gums. Similarly, this class of compositions may be employed where an organic liquid or low melting solid is desired to impart fire retardent properties.

The products contemplated by this invention are made advantageously from phosphorus sulfochloride ($PSCl_3$) by first reacting with an alcohol to form the alkyl substituted chloride and subsequently reacting this material with a sodium phenolate. The alcohol employed should be anhydrous and may consist among others of one or more of the following: methyl, ethyl, butyl, amyl, benzyl, mono alkyl ethers of glycols, including mono methyl ether of ethylene glycol, mono-butyl ether of ethylene glycol, as well as other aliphatic compounds having a free alcohol hydroxyl group. The phenols may include: monohydroxy benzene, chlorphenol, ortho meta and para cresols, naphthol, xylenol, as well as mixtures of two or more of these. The following specific example will serve to illustrate one method of preparing the novel compositions contemplated by this invention, it being understood that the invention is neither limited to the particular compositions disclosed herein, nor to any specific method of preparing the compositions.

Methyl diphenyl thiophosphate having the formula:

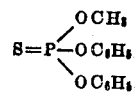

is prepared by reacting a molar proportion of anhydrous methyl alcohol with an equal molar proportion of phosphorus sulfochloride. The resulting product, which may be purified by distillation, preferably at reduced pressure, or used directly, is added slowly to two molar proportions of an aqueous solution of sodium phenate, or preferably by adding slowly to anhydrous sodium phenate suspended in an inert medium, such as toluol or xylol. In either case, the resulting mixture is washed with dilute soda to remove any unreacted phenol and subsequently with water to remove the alkali. In case an inert solvent has been employed, it is then removed by distillation.

By methods analogous to those described hereinabove, one may prepare ethyl diphenyl thiophosphate, dimethyl phenyl thiophosphate, methyl dicresyl thiophosphate, butyl diphenyl thiophosphate, methoxy ethyl diphenyl thiophosphate, etc.

Although from the foregoing description of the characteristics of the novel compositions hereinabove described, their use as plasticizers will be apparent to those skilled in the art, the following examples will serve to illustrate embodiments contemplated by the present invention. A solution of nitrocellulose made by dissolving 100 grams of nitro cotton (15 seconds) in a liter of solvent containing the following ratio of ingredients:

Ethyl alcohol _____ 10 volumes
Ethyl acetate _____ 12.5 volumes
Butyl acetate _____ 25 volumes
Benzol _____ 27.5 volumes
Urea _____ 1% by weight based on the cotton to be dissolved, to form a homogeneous solution with 50% by weight of methyl diphenyl thiophosphate. The solution so formed is deposited on a smooth surface and the solvent is allowed to evaporate slowly. The film so obtained is flexible, resistant to combustion, and stable to the influence of light and usual atmospheric conditions.

A cellulose acetate firm may be prepared conveniently by dissolving 1 kilogram of cellulose acetate in 6 liters of acetone to which has been added the equivalent of 30% by weight based on the cellulose acetate present of methyl diphenyl thiophosphate. A film obtained by evaporating the solvent is clear, flexible and relatively stable to atmospheric conditions.

A phenol formaldehyde resin, which is fusible, is fluxed with 30% of its weight of ethyl diphenyl thiophosphate. Thereafter the product is molded and rendered infusible by the application of heat in the usual manner.

Obviously, the manner of employing the novel plasticizing compositions disclosed hereinabove may be varied in accordance with present day practice in the plastic and cellulose arts without departing from the spirit of this invention as hereinabove described and hereinafter claimed.

What I claim is:

1. An ester composition having the structural formula:

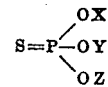

where X is a phenyl radical; Y is a phenyl radical or an alkyl radical, and Z is an alkyl radical.

2. A neutral organic ester of thiophosphoric acid (H3PSO3) of at least one alkyl alcohol and at least one mono hydroxy phenol.

3. Methyl diphenyl thiophosphoric acid.

4. A neutral ester of thiophosphoric acid and at least one monohydroxy phenol and at least one monohydroxy aliphatic alcohol.

5. As a new compound, diphenyl betamethoxyethyl thiophosphate.

ERIK CLEMMENSEN.